(No Model.) 9 Sheets—Sheet 1.
G. F. SIMONDS.
BALL BEARING.
No. 434,477. Patented Aug. 19, 1890.
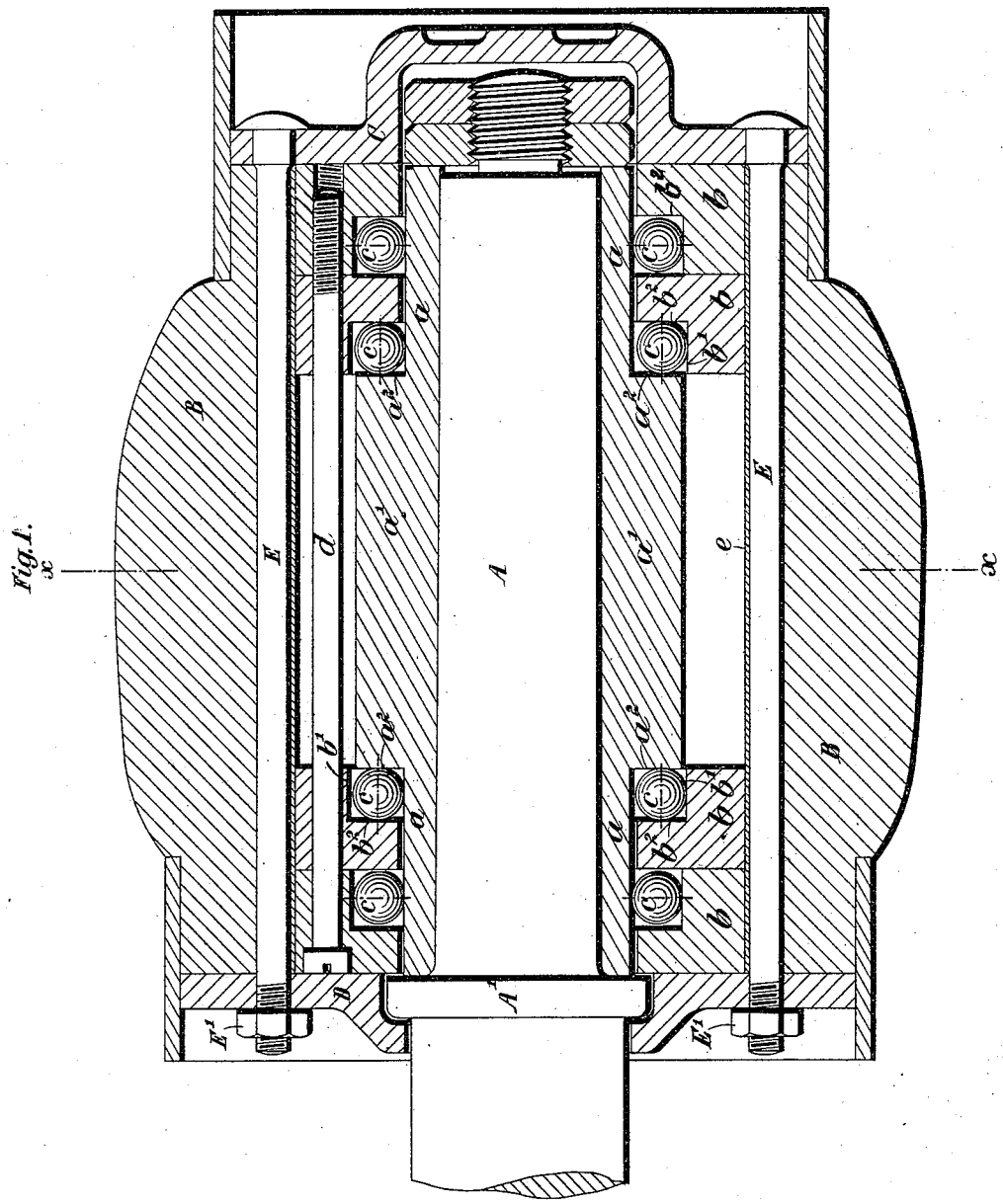

(No Model.) 9 Sheets—Sheet 2.

G. F. SIMONDS.
BALL BEARING.

No. 434,477. Patented Aug. 19, 1890.

(No Model.) 9 Sheets—Sheet 3.

G. F. SIMONDS.
BALL BEARING.

No. 434,477. Patented Aug. 19, 1890.

Witnesses:
J. A. Rutherford
Geo. W. Rea

Inventor
George F. Simonds
By James L. Norris
Attorney

THE NORRIS PETERS CO., PHOTO-LITHO., WASHINGTON, D. C.

(No Model.) 9 Sheets—Sheet 4.

G. F. SIMONDS.
BALL BEARING.

No. 434,477. Patented Aug. 19, 1890.

(No Model.) 9 Sheets—Sheet 5.

G. F. SIMONDS.
BALL BEARING.

No. 434,477. Patented Aug. 19, 1890.

(No Model.) 9 Sheets—Sheet 6.

G. F. SIMONDS.
BALL BEARING.

No. 434,477. Patented Aug. 19, 1890.

Witnesses:
J. A. Rutherford.
Geo. W. Rea.

Inventor:
George F. Simonds
By James L. Norris
Attorney.

(No Model.) 9 Sheets—Sheet 7.
G. F. SIMONDS.
BALL BEARING.
No. 434,477. Patented Aug. 19, 1890.
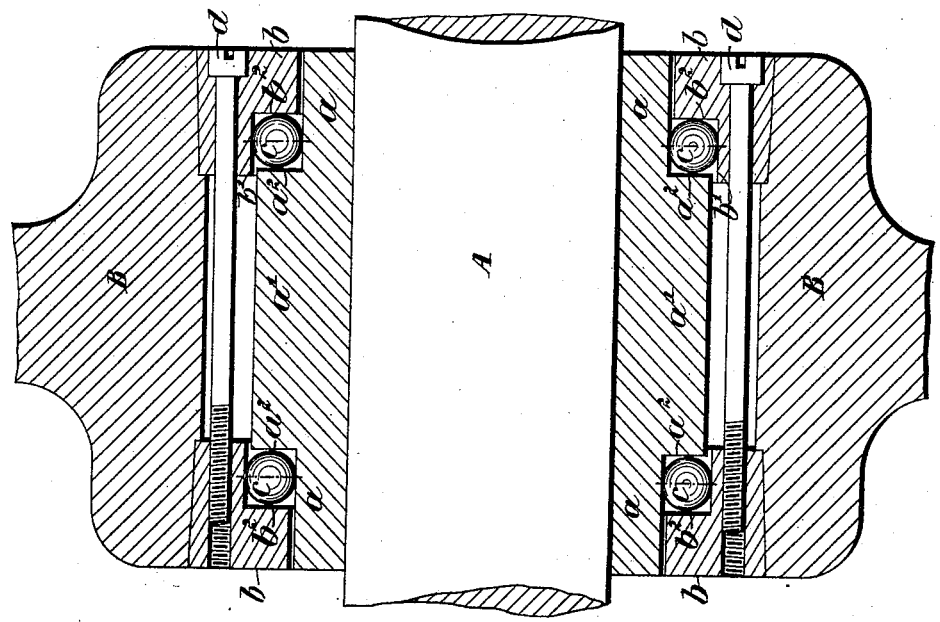
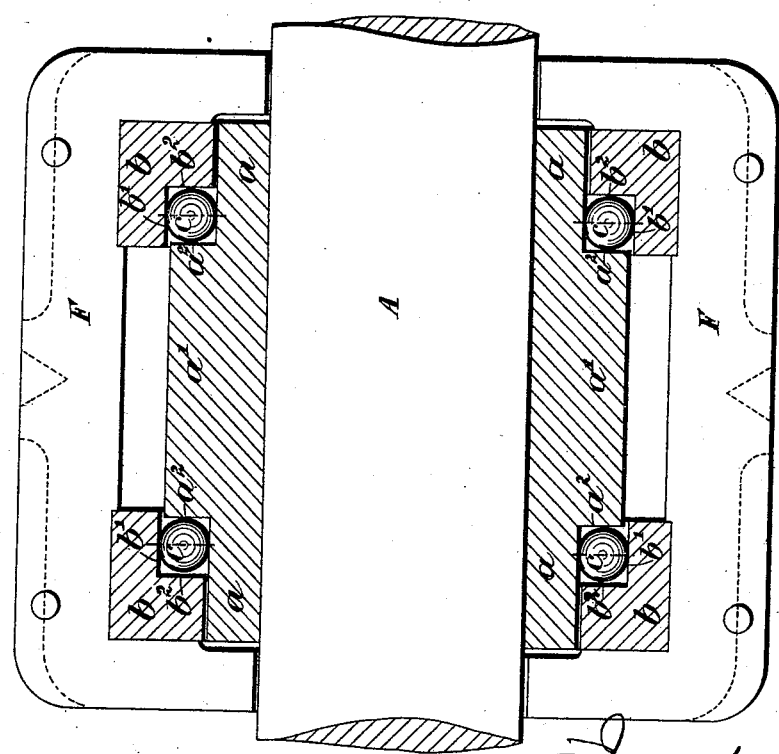
Witnesses:
J. A. Rutherford
Geo. W. Rea.
Inventor:
George F. Simonds
By James L. Norris
Attorney (No Model.) 9 Sheets—Sheet 8.

G. F. SIMONDS.
BALL BEARING.

No. 434,477. Patented Aug. 19, 1890.

Witnesses
J. A. Rutherford.
Geo. W. Rea.

Inventor:
George F. Simonds,
By James L. Norris
Attorney.

UNITED STATES PATENT OFFICE.

GEORGE FREDERICK SIMONDS, OF FITCHBURG, MASSACHUSETTS.

BALL-BEARING.

SPECIFICATION forming part of Letters Patent No. 434,477, dated August 19, 1890.

Application filed January 9, 1890. Serial No. 336,403. (No model.)

*To all whom it may concern:*

Be it known that I, GEORGE FREDERICK SIMONDS, engineer, a citizen of the United States, and a resident of Fitchburg, Massachusetts, have invented certain new and useful Improvements in Ball-Bearings, of which the following is a specification, reference being had to the accompanying drawings.

My invention relates to thrust or end-pressure and other bearings in which spherical rollers or balls are employed for diminishing the friction.

An important feature of my said invention is the combination of a removable tubular piece or sleeve having an external or an internal circumferential projection, rib, or collar, two or more removable rings or annular pieces, one or more of which are arranged on one side of the said collar, the remainder being arranged on the other side thereof, and balls arranged in circular series or groups between the said rings and the tubular piece or sleeve. I prefer to make the said rib or collar with plane surfaces parallel to each other, and to make each of the said rings or annular pieces with a surface concentric with the said tubular piece or sleeve and with a plane surface perpendicular or at right angles to the said concentric surface and parallel to the plane surfaces of the said rib or collar, so that when the said tubular piece or sleeve and the rings are placed in their proper relative positions annular channels or cavities will be formed between them for the reception of the balls.

My said invention, moreover, comprises improved means for adjusting the said rings or annular pieces relatively to the rib or collar on the tubular piece or sleeve to bring the balls to a bearing against the plane surfaces of the said rings and collar and to compensate for wear, if necessary. For this purpose I prefer to use adjusting-screws, which are passed through one or more of the said rings, and are screwed into another of the said rings. These screws in some instances serve for securing together the parts of the bearing in such a manner that they form a complete device ready for application to a shaft or the like or for insertion into the nave or hub of a wheel or pulley. I sometimes, however, employ other suitable means for adjusting the plane bearing-surfaces relatively to each other.

My said invention, moreover, comprises other improvements hereinafter set forth.

In the accompanying drawings, Figure 1 is a longitudinal central section showing one form of axle-bearing constructed according to my said invention. Fig. 2 is a transverse section on the line $x\ x$, Fig. 1. Figs. 3 to 11 are longitudinal central sections illustrating other forms or modifications of my improved ball-bearing.

Like letters indicate corresponding parts throughout the drawings.

$a$ is the removable tubular piece or sleeve, which is provided with a circumferential projection, rib, or collar $a'$.

$b\ b$ are the removable rings or annular pieces, one or more of which are arranged on one side of the said rib or collar $a'$ of the tubular piece or sleeve and the remainder on the other side thereof.

$c\ c$ are the spherical rollers or balls, which are arranged in circular series or groups between the said rings and the tubular piece or sleeve $a$. $d\ d$ are screws for adjusting the rings $b$ relatively to the rib or collar $a'$ on the tubular piece or sleeve $a$.

In the bearing shown in Figs. 1 and 2 the tubular piece or sleeve $a$ has an external rib or collar $a'$, and is fixed upon the shaft or axle A, and the rings $b$ are located in the nave or hub B and surround the said tubular piece or sleeve. The said rib or collar is formed in one with the tubular piece or sleeve and has plane bearing-surfaces $a^2$ parallel to each other. The rings $b$ are formed with surfaces $b'$, which are concentric with the tubular piece or sleeve $a$, and with plane surfaces $b^2$, which are parallel to those of the rib or collar $a'$. The balls $c$ of the series or groups between the rib or collar $a'$ and the adjacent rings $b$ bear against and roll upon the plane surfaces $a^2\ b^2$ of the said collar and rings, the concentric surfaces $b'$ of the said rings serving to retain the said balls in place. The balls $c$ of the other series or groups bear against and roll between the exterior surface of the tubular piece or sleeve $a$ and the concentric surfaces $b'$ of the corresponding rings $b$, the plane surfaces $b^2$ of these rings serving to retain the said balls in place. There are three adjusting-screws $d$, which are passed through the rings $b$ on one side of the collar $a'$ and through one of the said rings on the other side of the said collar and are screwed into the remaining ring $b$. It is evident that by means of the screws $d$ the rings $b$ can be adjusted relatively to the collar $a'$ to bring the balls $c$ between the said collar and the adjacent rings $b$ to a bearing, or to compensate for wear, if necessary. The parts of the bearing when secured together by the said screws form a complete device, which can be inserted in and removed from the nave or hub B of the wheel, and can be readily placed upon or removed from the shaft or axle with the said wheel. C is a cap or cover placed over the outer end of the bearing, and D is an annular plate surrounding the axle A at the inner end of the bearing. The said cap and plate are securely held in place by screw-bolts E, provided with nuts E'. The said cap and plate close or partially close the ends of the bearing, so that it can contain a considerable quantity of oil or other lubricant without liability to leakage. To prevent the said oil or other lubricant from coming in contact with the wood of which the nave or hub is formed, I prefer to introduce into the said nave or hub a thin lining or bushing $e$, of sheet metal or other suitable material, the ends of which may be turned or folded over and secured to the nave or hub in any convenient manner.

In Fig. 3 I have shown another axle-bearing constructed substantially as described with reference to Figs. 1 and 2, with the exception that the collar $a'$ of the sleeve $a$ is of much less width than that shown in Fig. 1, and the bearing is consequently considerably shorter than the bearing shown in that figure, and the screws $d$ are passed through only one of the rings $b$ on one side of the said collar, and are screwed into the adjacent ring $b$ on the other side thereof.

Fig. 4 shows a bearing similar to that shown in Fig. 3, with the exception that the screws $d$ are passed through three of the rings and are screwed into the remaining ring. This bearing is designed to be fitted into a suitable box, casing, or pedestal, and the parts are secured together by the screws $d$ in such a manner that they form a complete device, ready for insertion into such box or casing or for application to a shaft or axle.

In the modification of my improved ball-bearing shown in Fig. 5 three circular series or groups of balls $c$ are arranged between the sleeve $a$ and each of the rings $b$ at the ends of the bearing, suitable rings $f$ being arranged between the said series or groups to separate the balls of one series from those of another series. The rings $b$ are in this modification fitted in a suitable box F, provided with a cover F', and the adjusting-screws $d$, instead of being passed through and screwed into the rings $b$, are screwed into tapped holes in the said cover and in the closed end of the said box, respectively.

Fig. 6 shows a bearing of somewhat similar construction to that shown in Fig. 5, one of the rings $b$ at one end of the bearing and the corresponding three series of balls, with the rings between them, and also the adjusting screws at the other end of the bearing, being dispensed with.

In Fig. 7 I have shown a bearing constructed according to my present invention for a car-axle. In this bearing there are two circular series of balls $c$, with a ring $f$ between them, arranged between the tubular piece or sleeve $a$ and the rings $b$ at each end of the bearing, other circular series or groups of balls $c$ being arranged between the collar $a'$ and the adjacent rings $b$. The screws $d$ are passed through tapped holes in the cover F' of the box or casing F.

Fig. 8 shows another modification of my improved bearing, wherein only two rings $b$ are arranged in combination with the tubular piece or sleeve $a$, a single series or group of balls being arranged between each of the said rings and the tubular piece or sleeve.

In Fig. 10 I have shown a bearing for a loose pulley or similar rotating part of machinery. In this bearing two rings $b$ are fitted in the nave or hub B of the pulley, and are secured therein by means of screws $d$, passed through one of the said rings and screwed into the other ring.

Figure 2:
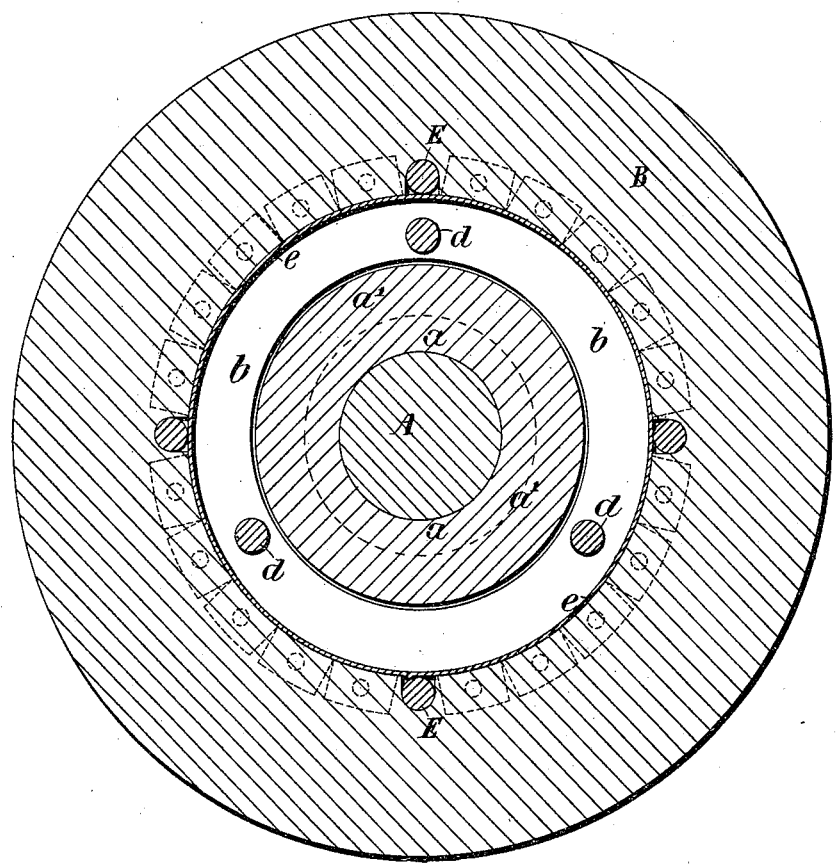
Figure 3:
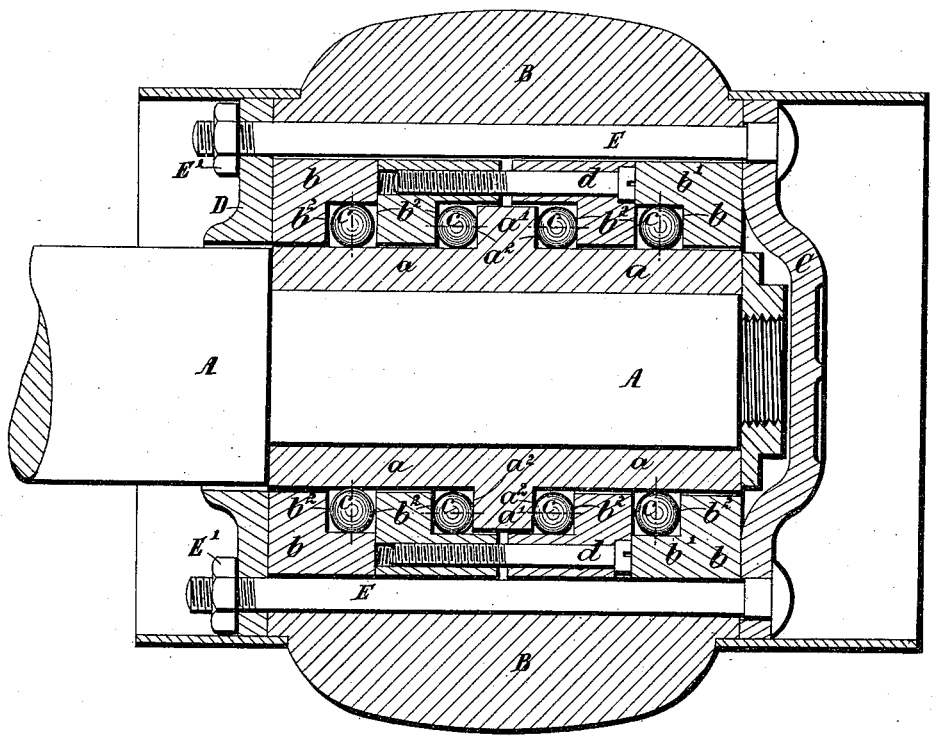
Figure 4:
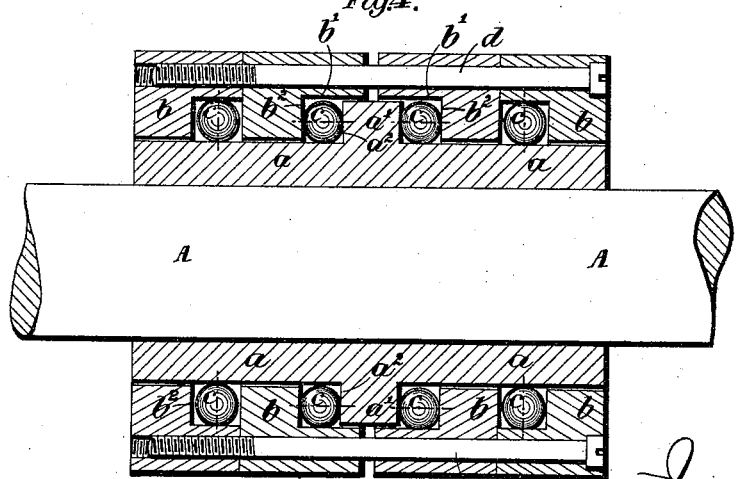
Figure 5:
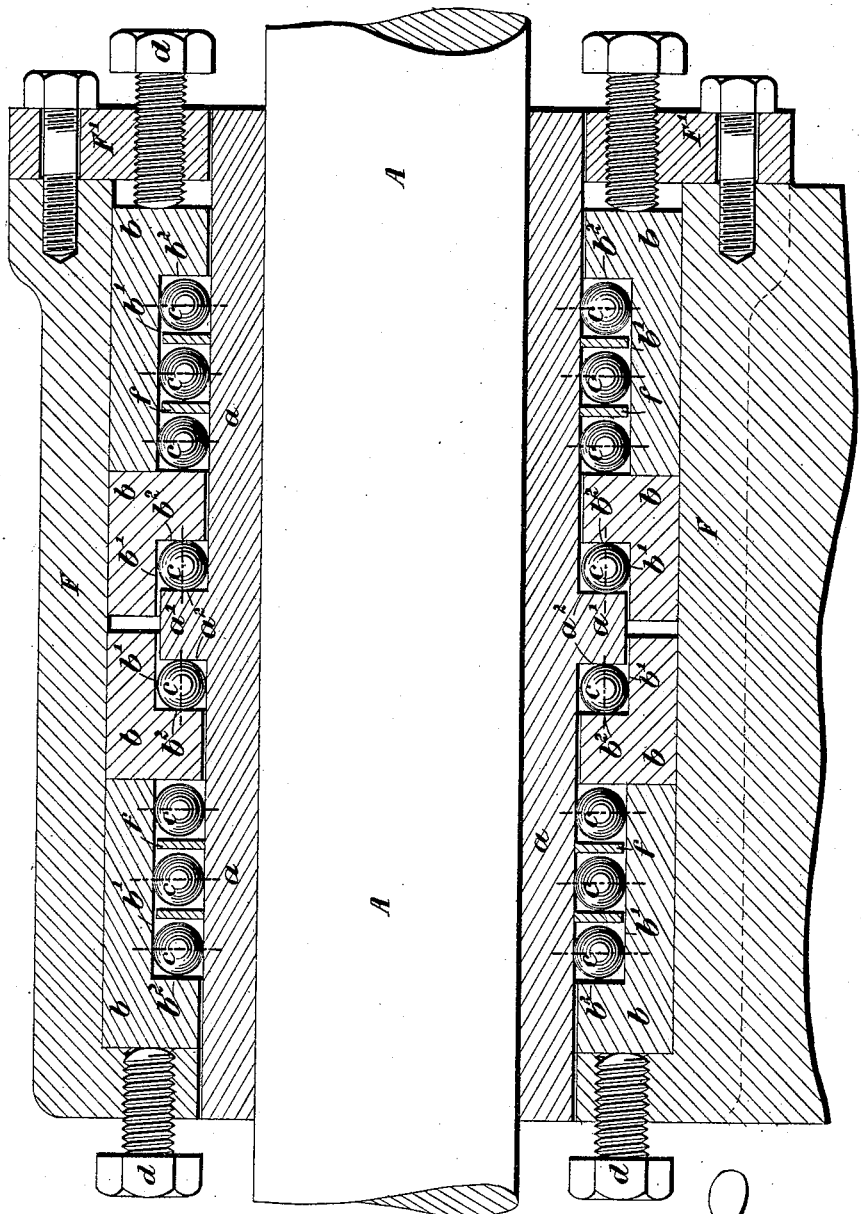
Figure 6:
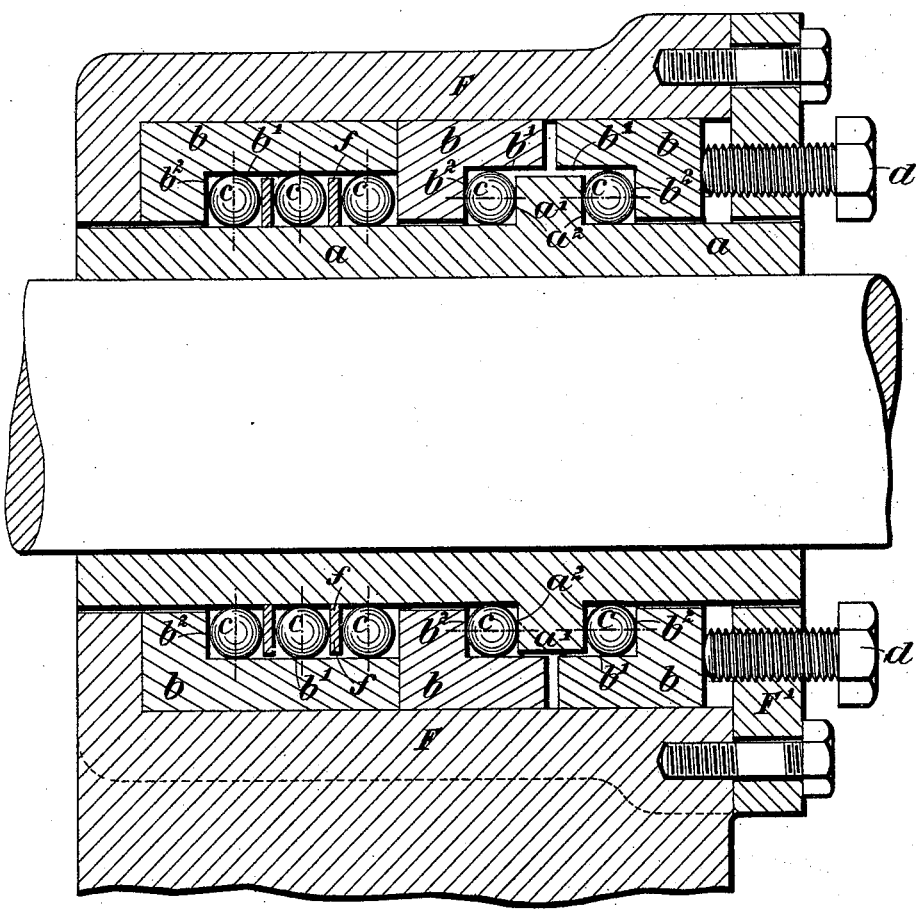
Figure 1:
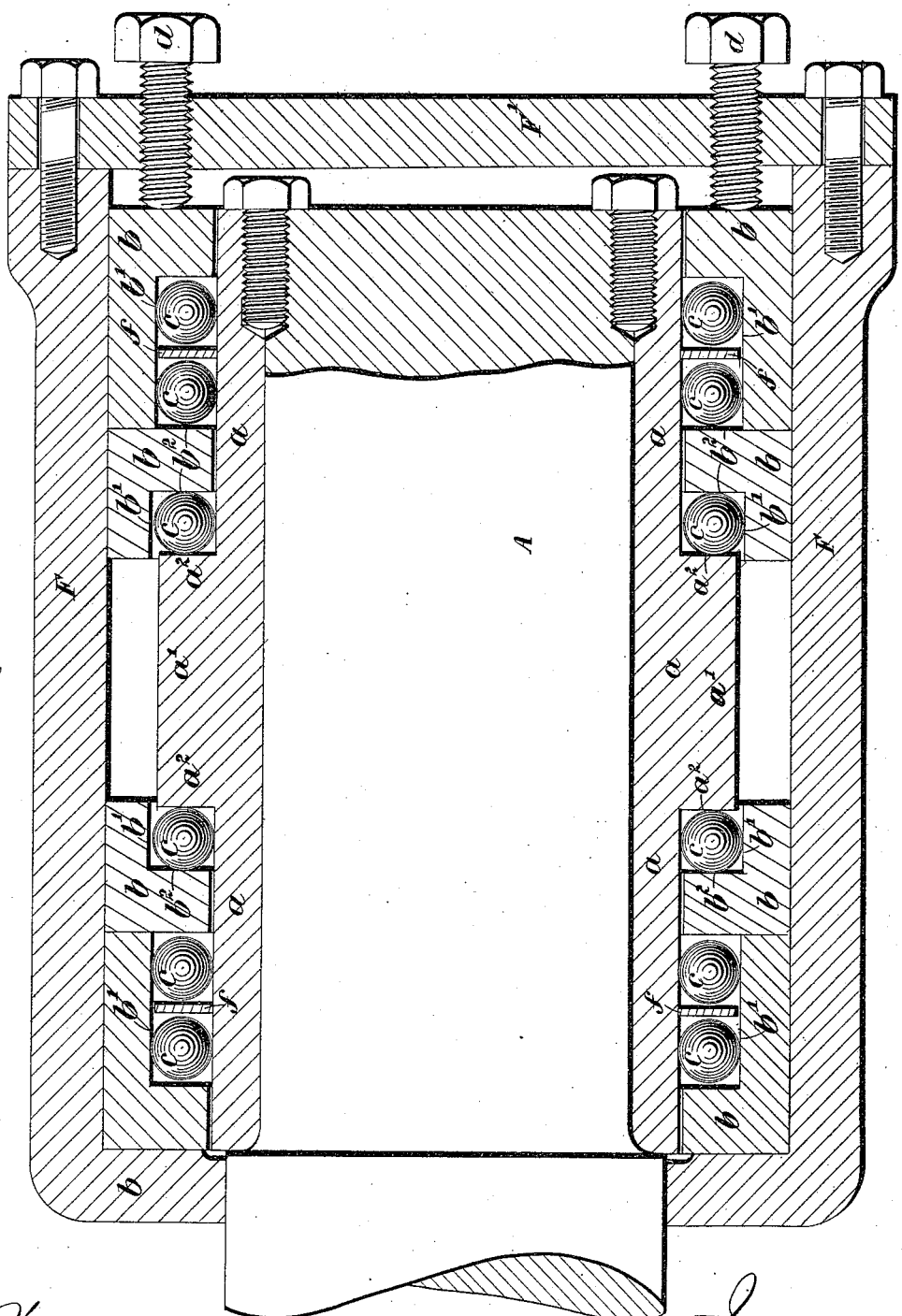
Figure 9:
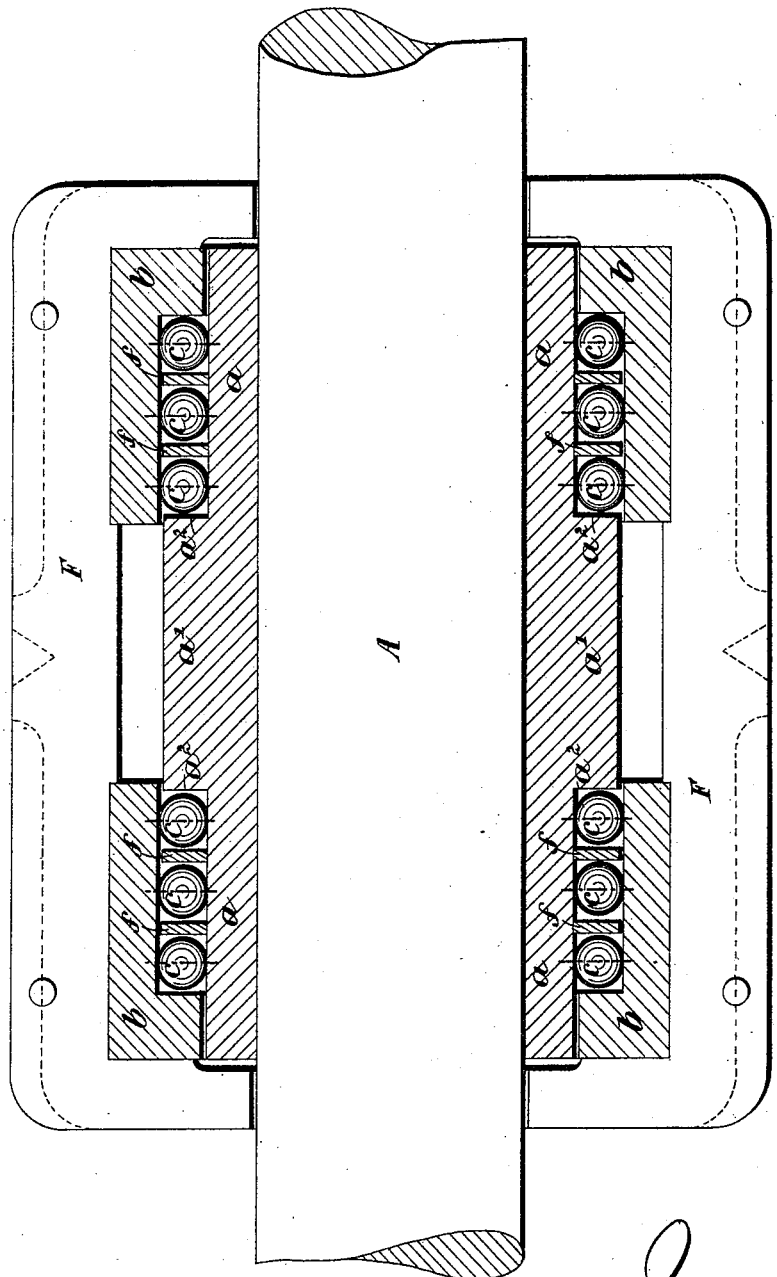
Fig. 9 shows a bearing of similar construction, wherein three series or groups of balls $c$, with rings $f$ between them, are arranged between each ring $b$ and the tubular piece or sleeve $a$.

The balls in the bearings shown in Figs. 8, 9, and 10 serve to support the weight of the rotating part. The balls in the bearings shown in Figs. 8 and 10 also serve to prevent longitudinal or endwise movement of the rotating relatively to the non-rotating parts.

Figure 11:
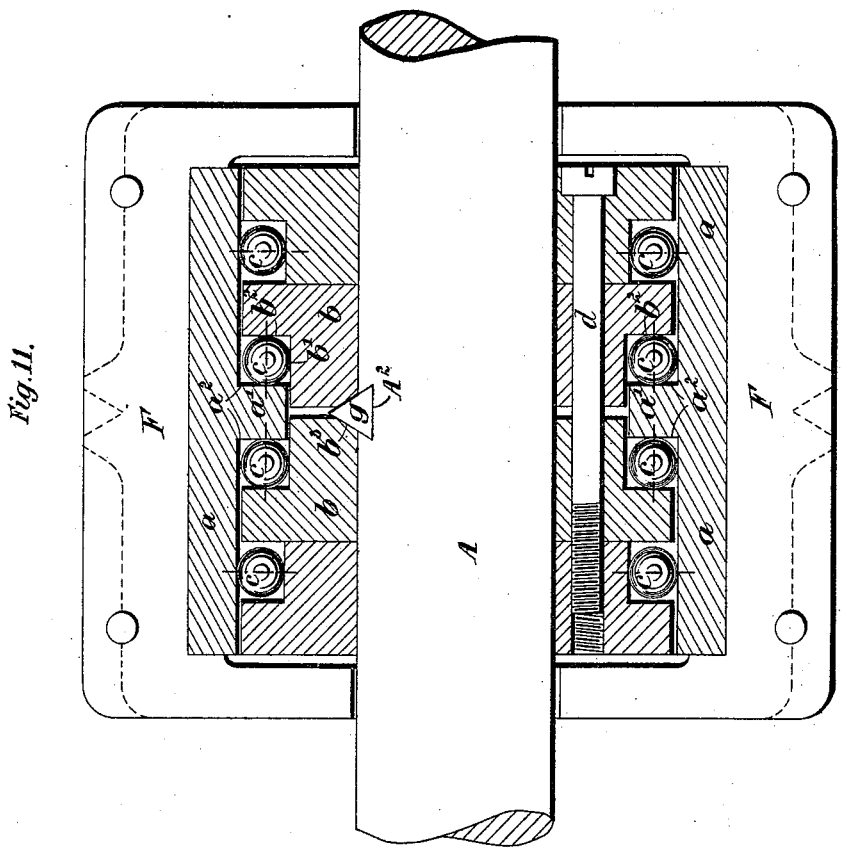

In the bearing shown in Fig. 11 the tubular piece $a$ has an internal circumferential projection or rib $a'$, and is secured in a box or casing F, and the rings or annular pieces $b$ are arranged within the said tubular piece $a$ and surround the shaft A. To firmly secure the said rings $b$ upon the shaft, I form in the said shaft a transverse slot or groove $A^2$, and I fit in this slot or groove a short metal bar or key $g$, preferably of triangular form in transverse section. Moreover, I make the rings $b$ next the collar $a'$ with suitable notches or recesses $b^3$, into which the said key will fit when the said rings are placed in their proper position upon the shaft A. By turning the screws $d$ the said rings can then be drawn tightly against the said key, and will thus be very securely held in place upon the shaft.

It is obvious that the number and arrangement of the rings and balls employed, in combination with the tubular piece or sleeve provided with the external or internal circumferential projection, rib, or collar, can be varied without departing from the nature of my said invention.

Certain features of construction shown and described, but not claimed in this application, are shown, described, and claimed in application Serial Nos. 331,639 and 336,700 filed by me.

What I claim is—

1. A ball-bearing comprising a tubular piece or sleeve having a circumferential projection, rib, or collar provided with surfaces which are in parallel planes, rings or annular pieces arranged one on each side of the said rib or collar and each having a surface concentric with the said tubular piece or sleeve and a plane surface parallel to those of the said rib or collar, and balls which are located between the said rings and the tubular piece or sleeve and which bear at diametrically-opposite points against and roll upon one pair of the said surfaces and are retained in place by the other pair thereof, substantially as and for the purpose set forth.

2. In a ball-bearing, the combination, with the rotating and non-rotating parts, of a tubular piece or sleeve provided with a circumferential projection, rib, or collar and detachably secured to one of the said parts, rings or annular pieces detachably secured to the other of the said parts—one on each side of the said rib or collar—the said tubular piece or sleeve having a surface concentric with the rotating part, and the rib or collar having parallel plane surfaces perpendicular to the axis thereof, each of the said rings having a surface concentric with the said rotating part and a plane surface parallel to those of the said rib or collar, and balls which are located between the rings and the said tubular piece or sleeve, and which bear at diametrically-opposite points against and roll upon one pair of the corresponding surfaces and are retained in place by the other pair thereof, substantially as and for the purposes set forth.

3. In a ball-bearing, the combination, with the rotating and non-rotating parts, of a tubular piece or sleeve detachably secured to one of the said parts and having a surface concentric therewith, and a circumferential projection, rib, or collar provided with bearing-surfaces in parallel planes at right angles to the said concentric surface, rings or annular pieces arranged one on each side of the said rib or collar and detachably secured to the other of the said parts, each of the said rings having a surface concentric with the rotating body and a bearing-surface in a plane parallel to those of the said rib or collar, and balls which are located between said rings and the tubular piece or sleeve, and which bear at diametrically-opposite points against and roll upon the said parallel plane surfaces and are retained in place by the said concentric surfaces, substantially as and for the purposes set forth.

4. In a ball-bearing, the combination, with the rotating and non-rotating parts, of a tubular piece or sleeve detachably secured to one of the said parts and having a surface concentric therewith, and a circumferential projection, rib, or collar provided with bearing-surfaces in parallel planes at right angles to the said concentric surface, rings or annular pieces arranged one on each side of the said rib or collar and detachably secured to the other of the said parts, each of the said rings having a surface concentric with the rotating body and a bearing-surface in a plane parallel to those of the said rib or collar, and balls which are located between the said rings and the tubular piece or sleeve, and which bear at diametrically-opposite points against and roll upon the said parallel plane surfaces and are retained in place by the said concentric surfaces, the said rings being adjustable relatively to the said rib or collar, substantially as and for the purposes set forth.

5. In a ball-bearing, the combination, with the rotating and non-rotating parts, of a tubular piece or sleeve detachably secured to one of the said parts and having a surface concentric therewith, and a circumferential projection, rib, or collar provided with bearing-surfaces in parallel planes at right angles to the said concentric surface, rings or annular pieces arranged one on each side of the said rib or collar and detachably secured to the other of the said parts, each of the said rings having a surface concentric with the rotating body and a bearing-surface in a plane parallel to those of the said rib or collar, balls which are located between the said rings and the tubular piece or sleeve, and which bear against and roll upon the said concentric surfaces and are retained in place by the said plane surfaces, and screws for adjusting the said rings relatively to the said rib or collar, substantially as and for the purposes set forth.

6. In a ball-bearing, the combination of a bearing-surface having a circumferential projection, rings or annular pieces concentric with said bearing-surface and having circumferential projections, and balls arranged between the circumferential projections on said bearing-surface, and rings to resist both radial and end thrust, the balls for resisting end-thrust being located in longitudinal planes between those for supporting radial pressure, substantially as described.

7. In a ball-bearing, the combination of a box or casing, rings or sleeves within the said box or casing, and circular series or groups of balls arranged between the said rings or sleeves and box or casing for supporting or resisting radial pressure and thrust or end pressure, the groups of balls for resisting thrust or end pressure being located between those for supporting radial pressure, for the purpose above specified.

8. In a ball-bearing, the combination of a tubular piece or sleeve $a$, provided with a circumferential rib or collar $a'$, having plane surfaces at right angles to concentric surface, rings or annular pieces $b$ on both sides of the said rib or collar having plane surfaces parallel to those on the corresponding rib or collars, balls c, arranged in circular series or groups between the said rings and tubular piece or sleeve, and the whole inclosed in a case or box, substantially as described.

9. In a ball-bearing, the combination of a tubular piece or sleeve provided with a circumferential projection, rib, or collar, rings or annular pieces arranged one on each side of the said rib or collar, balls arranged in circular series or groups between the said rings and the rib or collar, and adjusting-screws passed through one or more of the said rings and screwed into another of the same, substantially as and for the purposes above specified.

10. In a ball-bearing, the combination of a tubular piece or sleeve provided with a circumferential projection, rib, or collar having plane bearing-surfaces, rings or annular pieces with corresponding plane bearing-surfaces arranged one on each side of the said rib or collar, a ring or annular piece having a bearing-surface concentric with the said tubular piece or sleeve, and balls arranged in circular series or groups between the said rings and the tubular piece or sleeve, substantially as and for the purposes above specified.

11. In a ball-bearing, the combination of a tubular piece or sleeve provided with a circumferential projection, rib, or collar having plane bearing-surfaces, rings or annular pieces with corresponding plane bearing-surfaces arranged one on each side of the said rib or collar, other rings or annular pieces having bearing-surfaces concentric with the said tubular piece or sleeve, balls arranged in circular series or groups between the said rings and the tubular piece or sleeve, and screws for adjusting the said rings relatively to the said rib or collar, substantially as and for the purposes above specified.

12. In a ball-bearing, the combination of a tubular piece or sleeve provided with a circumferential projection, rib, or collar, rings or annular pieces arranged on each side of the said rib or collar, and balls arranged in circular series or groups between the said rib or collar and the rings or annular pieces, and screws holding the parts of the bearing together, so that they form a complete device ready for application to a shaft, axle, or the like, or for insertion into the nave or hub of a wheel, pulley, or the like, substantially as and for the purposes set forth.

13. In a ball-bearing, the combination of a tubular piece or sleeve $a$, provided with a circumferential rib or collar $a'$, rings or annular pieces $b$ on both sides of the said rib or collar, balls $c$, arranged in circular series or groups between the said rings and the tubular piece or sleeve, and adjusting-screws $d$, passed through one or more of the said rings and screwed into another of the same, substantially as and for the purposes set forth.

14. In a ball-bearing, the combination of a tubular piece or sleeve $a$, having a circumferential rib or collar $a'$, fixed upon a shaft or axle A, rings or annular pieces $b$, secured in the nave or hub of a wheel or pulley or in a box or casing, balls $c$, arranged in circular series or groups between the said rings and the tubular piece or sleeve, and adjusting-screws $d$, passed through one or more of the said rings and screwed into another of the same, substantially as and for the purposes set forth.

15. In a ball-bearing, the combination, with the rings or annular pieces arranged one on each side of the rib or collar on the tubular piece or sleeve, of a shaft or axle having a transverse slot or groove, a bar or key fitted in the said groove and engaging in notches or recesses in the said rings, and means, substantially as above described, for keeping the said rings in engagement with the said key, substantially as and for the purposes set forth.

In testimony whereof I have hereunto signed my name in the presence of two subscribing witnesses.

GEORGE FREDERICK SIMONDS.

Witnesses:
DAVID YOUNG,
CHAS. B. BURDON.